(12) United States Patent
Minamiura et al.

(10) Patent No.: US 12,368,176 B2
(45) Date of Patent: Jul. 22, 2025

(54) MEMBRANE ELECTRODE ASSEMBLY AND FUEL CELL

(71) Applicant: Panasonic Intellectual Property Management Co., Ltd., Osaka (JP)

(72) Inventors: Takeshi Minamiura, Osaka Fu (JP); Kenichi Ezaki, Osaka Fu (JP); Shinichiro Imura, Hyogo Ken (JP); Tsutomu Kawashima, Nara Ken (JP); Miyuki Yoshimoto, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 573 days.

(21) Appl. No.: 17/849,000

(22) Filed: Jun. 24, 2022

(65) Prior Publication Data

US 2022/0336834 A1    Oct. 20, 2022

Related U.S. Application Data

(63) Continuation of application No. PCT/JP2020/047039, filed on Dec. 16, 2020.

(30) Foreign Application Priority Data

Dec. 26, 2019  (JP) ................................. 2019-236906
Dec. 26, 2019  (JP) ................................. 2019-236907

(51) Int. Cl.
*H01M 8/1004* (2016.01)
*H01M 4/86* (2006.01)
(Continued)

(52) U.S. Cl.
CPC ....... *H01M 8/1004* (2013.01); *H01M 4/8657* (2013.01); *H01M 4/9083* (2013.01); *H01M 8/026* (2013.01); *H01M 8/0263* (2013.01)

(58) Field of Classification Search
CPC ............. H01M 8/1004; H01M 4/8657; H01M 4/9083; H01M 8/026; H01M 8/0263; Y02E 60/50
See application file for complete search history.

(56) References Cited

U.S. PATENT DOCUMENTS

2004/0131920 A1   7/2004  Yoshida et al.
2012/0094215 A1   4/2012  Satou et al.
(Continued)

FOREIGN PATENT DOCUMENTS

CN        1507099 A      6/2004
CN       103477486 A    12/2013
(Continued)

OTHER PUBLICATIONS

International Search Report dated Mar. 2, 2021 issued in International Patent Application No. PCT/JP2020/047039, with English translation.
(Continued)

Primary Examiner — Daniel S Gatewood
(74) Attorney, Agent, or Firm — Rimon P.C.

(57) ABSTRACT

A membrane electrode assembly for a fuel cell, the membrane electrode assembly including an electrolyte membrane, and a first electrode and a second electrode sandwiching the electrolyte membrane, wherein the first electrode includes a first catalyst layer and a first gas diffusion layer in order from the electrolyte membrane side, the first gas diffusion layer includes a first fibrous conductive member and a first resin material, the first catalyst layer includes a second fibrous conductive member, catalyst particles, and a second resin material, when viewed from a stacking direction of the membrane electrode assembly, a first angle formed by the first fibrous conductive member and a main flow path of a gas supplied to the membrane electrode assembly is arbitrary, and a second angle formed
(Continued)

by the second fibrous conductive member and the main flow path is 45° or less.

5 Claims, 14 Drawing Sheets

(51) Int. Cl.
*H01M 4/90* (2006.01)
*H01M 8/026* (2016.01)
*H01M 8/0263* (2016.01)

(56) References Cited

U.S. PATENT DOCUMENTS

| | | |
|---|---|---|
| 2014/0038077 A1 | 2/2014 | Takeuchi et al. |
| 2020/0335797 A1 | 10/2020 | Ishimoto et al. |
| 2021/0075024 A1 | 3/2021 | Minamiura et al. |
| 2021/0143460 A1* | 5/2021 | Ishimoto ............. H01M 8/1004 |

FOREIGN PATENT DOCUMENTS

| | | | | |
|---|---|---|---|---|
| CN | 110383548 A | | 10/2019 | |
| JP | 2005222841 A | * | 8/2005 | |
| JP | 2008066139 A | * | 3/2008 | |
| JP | 2011-049179 A | | 3/2011 | |
| JP | 2015-005525 A | | 1/2015 | |
| WO | WO-2018155220 A1 | * | 8/2018 | .......... H01M 4/8605 |
| WO | 2019/131707 A1 | | 7/2019 | |
| WO | 2019/131709 A1 | | 7/2019 | |

OTHER PUBLICATIONS

Chinese Office Action with its partical English translation dated Aug. 30, 2023 issued in the corresponding Chinese Patent Application No. 202080086255.8.

Xiaoli, Wang, et al. "Progress of Gas Diffusion Layer for Proton Exchange Membrane Fuel Cells," Progress in Chemistry, vol. 18, No. 4, Apr. 24, 2006, pp. 508-513, with engl abstract.

* cited by examiner

[FIG. 1A]
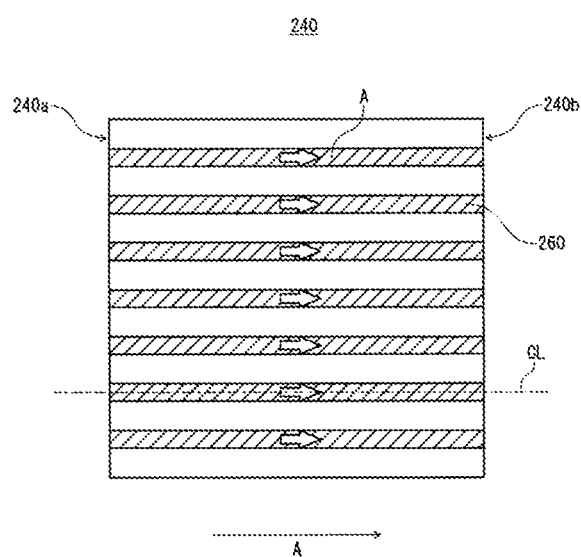

[FIG. 1B]
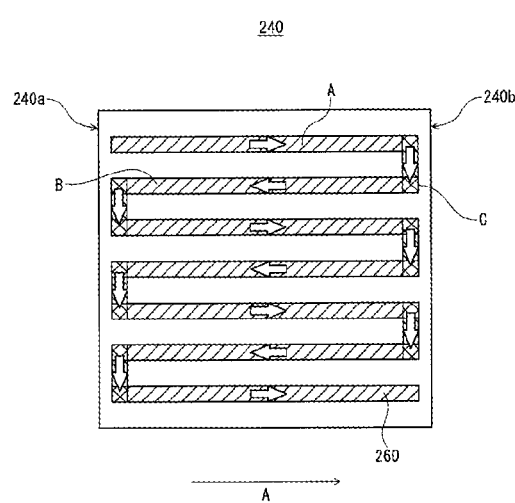

[FIG. 2]
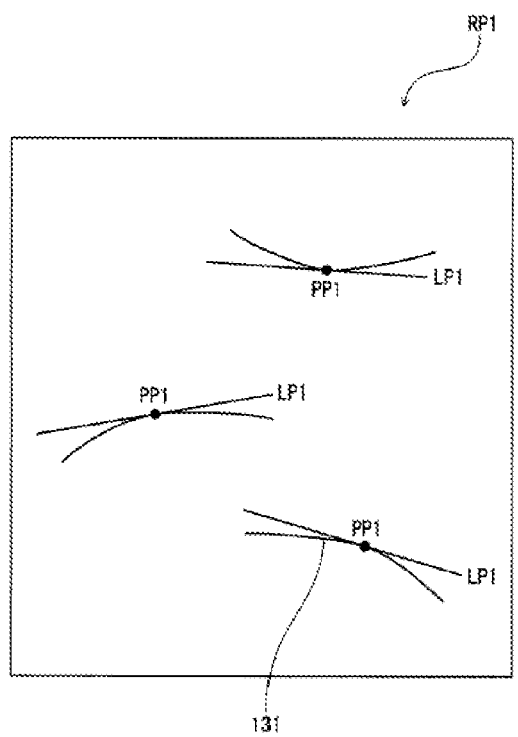

[FIG. 3]
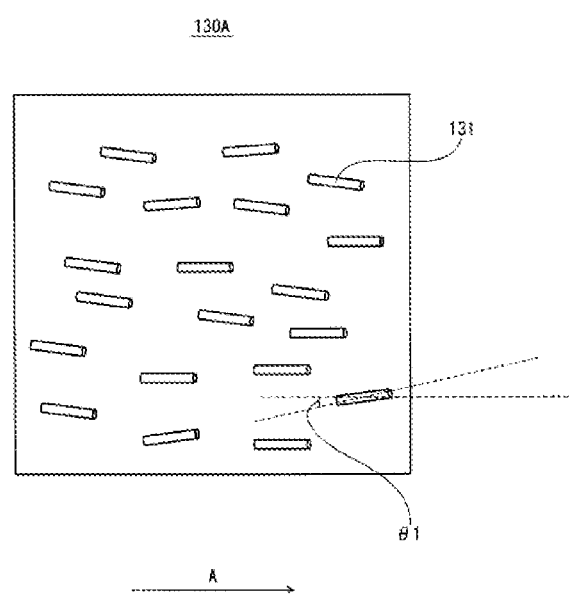

[FIG. 4]
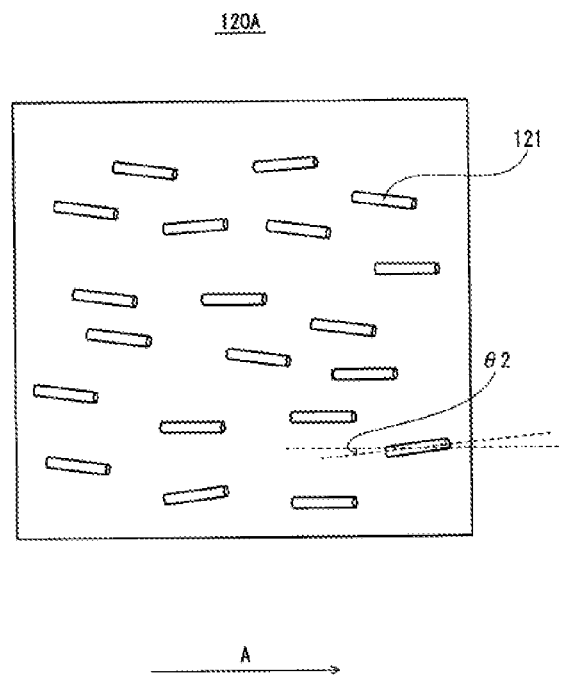

[FIG. 5]
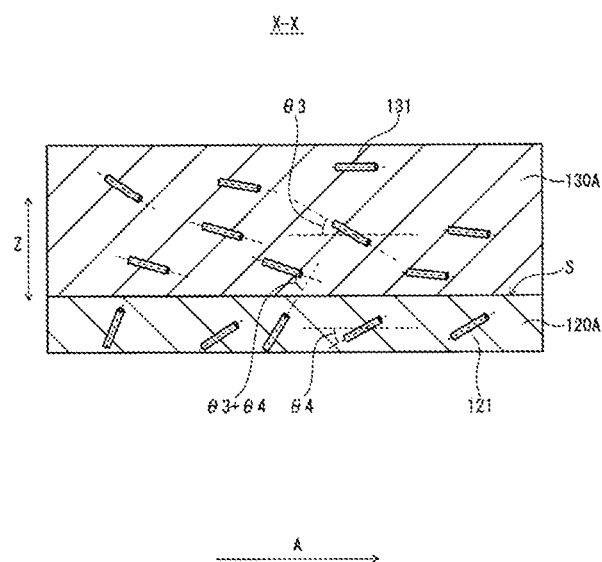

[FIG. 6]
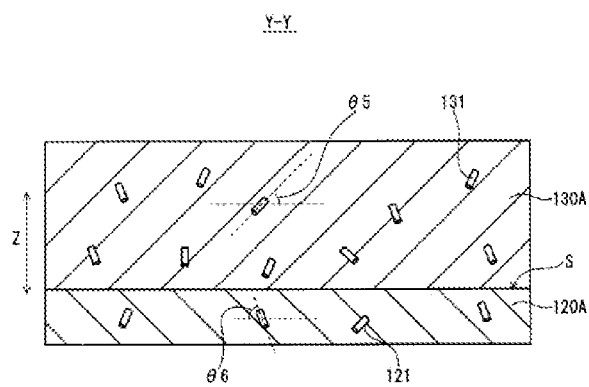

[FIG. 7]
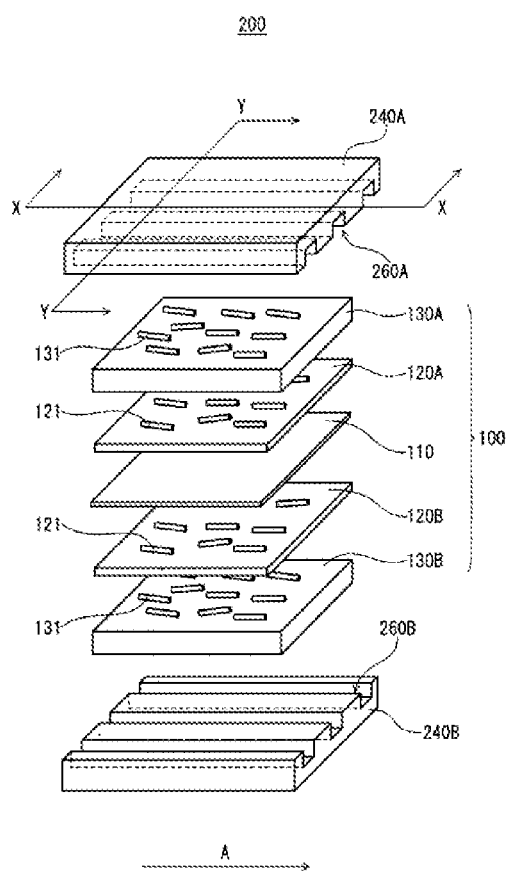

[FIG. 8]
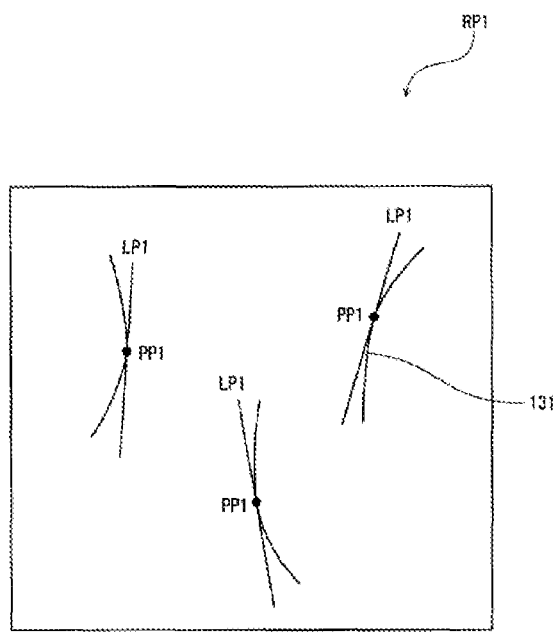

[FIG. 9]
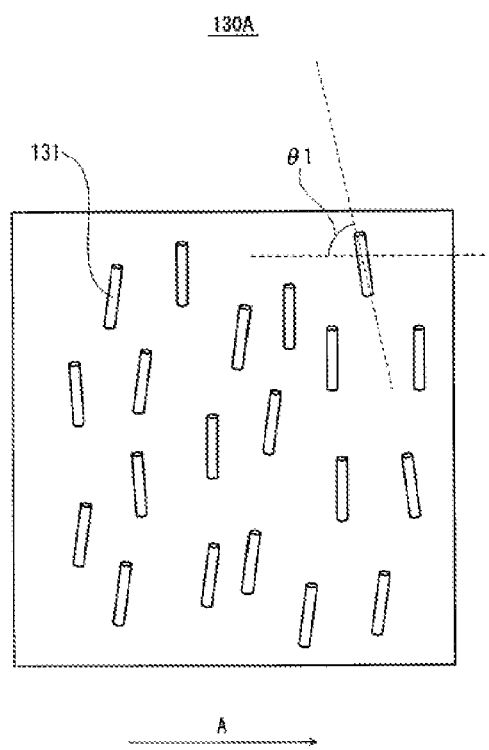

[FIG. 10]
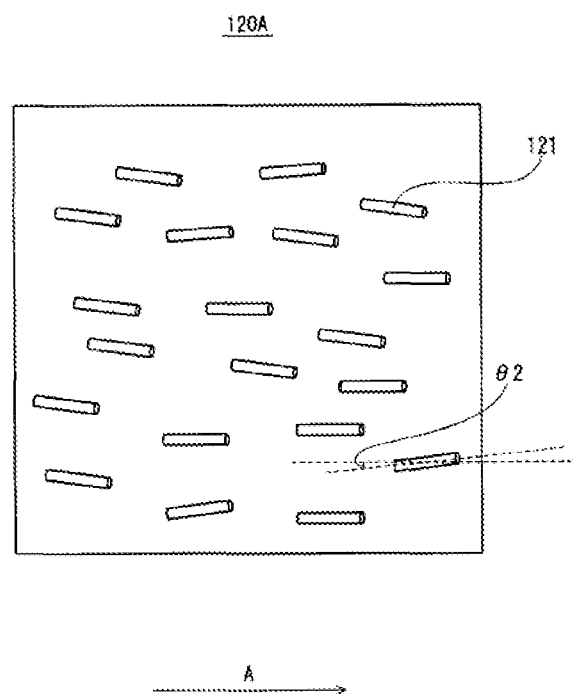

[FIG. 11]
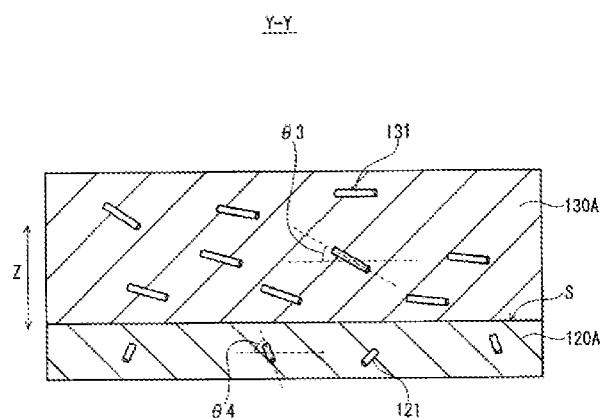

[FIG. 12]
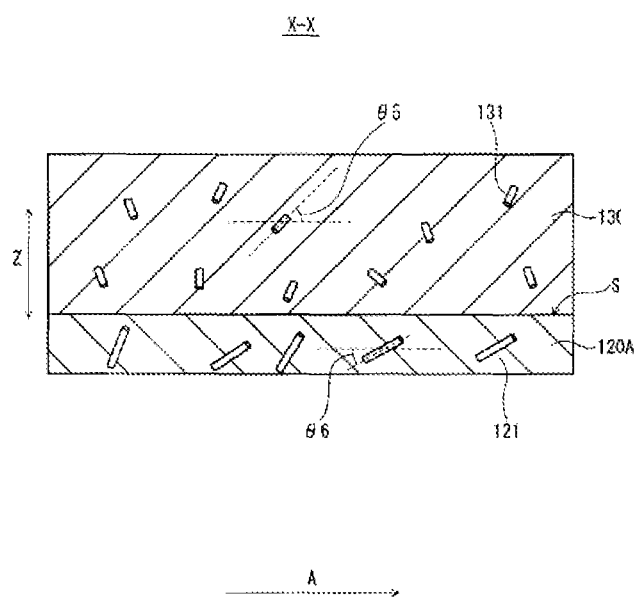

[FIG. 13]
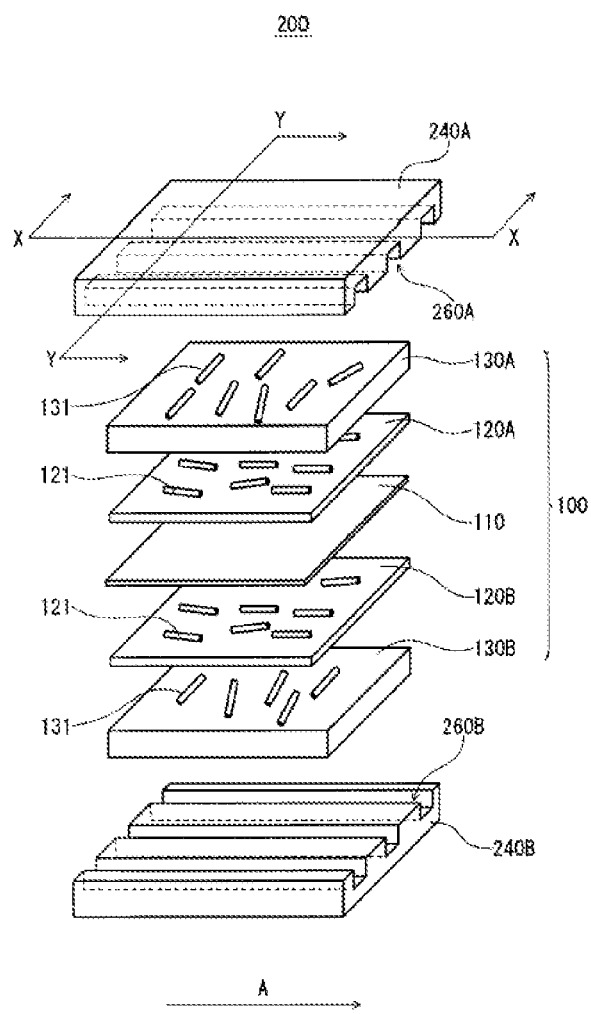

MEMBRANE ELECTRODE ASSEMBLY AND FUEL CELL

CROSS-REFERENCE TO RELATED APPLICATIONS

This application is a Continuation of International Patent Application No. PCT/JP2020/047039, filed on Dec. 16, 2020, which in turn claims the benefit of Japanese Patent Application No. 2019-236906, filed on Dec. 26, 2019, Japanese Patent Application No. 2019-236907, filed on Dec. 26, 2019, the entire disclosures of which Applications are incorporated by reference herein.

TECHNICAL FIELD

The present invention relates to a membrane electrode assembly for a fuel cell, and a fuel cell.

BACKGROUND ART

A fuel cell includes a membrane electrode assembly that includes an electrolyte membrane and a pair of electrodes that sandwich the electrolyte membrane. Each of the pair of electrodes includes a catalyst layer and a gas diffusion layer in this order from the electrolyte membrane side.

Patent Literature 1 proposes forming a gas diffusion layer with three or more layers, and changing the inclination direction of the conductive carbon fibers included in each layer. Thus, a gas diffusion layer having excellent gas diffusivity can be provided at a low cost.

CITATION LIST

Patent Literature

PLT1: Japanese Laid-Open Patent Publication 2015-5525

SUMMARY OF INVENTION

Solution to Problem

However, in the method of Patent Literature 1, the gas diffusivity is not sufficiently improved.

Means for Solving the Problem

One aspect of the present invention relates to a membrane electrode assembly for a fuel cell, the membrane electrode assembly including an electrolyte membrane, and a first electrode and a second electrode sandwiching the electrolyte membrane, wherein the first electrode includes a first catalyst layer and a first gas diffusion layer in order from the electrolyte membrane side; the first gas diffusion layer includes a first fibrous conductive member and a first resin material; the first catalyst layer includes a second fibrous conductive member, catalyst particles, and a second resin material; when viewed from the stacking direction of the membrane electrode assembly, a first angle formed by the first fibrous conductive member and a main flow path of a gas supplied to the membrane electrode assembly is arbitrary; and a second angle formed by the second fibrous conductive member and the main flow path is 45° or less.

Another aspect of the present invention relates to a fuel cell including the membrane electrode assembly described above, and a first separator and a second separator sandwiching the membrane electrode assembly.

Effects of Invention

According to the present invention, the gas diffusivity in the membrane electrode assembly is improved. Also, a fuel cell with excellent output characteristics can be provided.

BRIEF DESCRIPTION OF DRAWINGS

FIG. 1A A plan view schematically showing a parallel-type gas flow path formed in the separator.

FIG. 1B A plan view schematically showing a serpentine-type gas flow path formed in the separator.

FIG. 2 An illustration of how a tangent line of the fibrous conductive member is drawn with reference to the main surface of the first gas diffusion layer.

FIG. 3 A schematic plan view of a first gas diffusion layer according to an embodiment of the present invention viewed from a stacking direction of the MEA.

FIG. 4 A schematic plan view of a first catalyst layer according to an embodiment of the present invention viewed from a stacking direction of the MEA.

FIG. 5 A schematic sectional view taken along the main flow path of the MEA according to an embodiment of the present invention.

FIG. 6 A schematic sectional view taken along a direction crossing the main flow path of the MEA according to an embodiment of the present invention.

FIG. 7 An exploded perspective view showing components of a unit cell disposed in the fuel cell according to an embodiment of the present invention.

FIG. 8 Another illustration of how the tangent line of the fibrous conductive member is drawn with reference to the main surface of the first gas diffusion layer.

FIG. 9 A schematic plan view of a first gas diffusion layer according to another embodiment of the present invention viewed from a stacking direction of the MEA.

FIG. 10 A schematic plan view of the first catalyst layer according to another embodiment of the present invention viewed from a stacking direction of the MEA.

FIG. 11 A schematic sectional view taken along a direction crossing the main flow path of the MEA according to another embodiment of the present invention.

FIG. 12 A schematic sectional view taken along the main flow path of the MEA according to another embodiment of the present invention.

FIG. 13 An exploded perspective view showing components of a unit cell disposed in the fuel cell according to another embodiment of the present invention.

DESCRIPTION OF EMBODIMENTS

First Embodiment

A fuel gas or oxidizing gas (hereinafter, simply referred to as gas) flows from the gas diffusion layer toward the electrolyte membrane. The gas is supplied to the gas diffusion layer, for example, through a separator disposed outside the gas diffusion layer or a flow path formed in the gas diffusion layer. Therefore, in order to increase the gas diffusivity, it is necessary to consider the extending direction of the gas flow path.

Each of the gas diffusion layer and the catalyst layer according to the present embodiment includes a fibrous conductive member. In the present embodiment, the fibrous conductive members of the gas diffusion layer and the catalyst layer are oriented along the main flow path of the gas. As a result, the gas smoothly enters the gas diffusion layer and the catalyst layer without being blocked by the fibrous conductive member, and is diffused in the plane direction. That is, the pressure loss is suppressed, and the gas diffusivity in the electrode is improved. The membrane electrode assembly according to the present embodiment is particularly useful for a fuel cell having a plurality of gas flow paths with relatively small intervals.

[Membrane Electrode Assembly]

The membrane electrode assembly (hereinafter, sometimes referred to as MEA) according to the present embodiment includes an electrolyte membrane and a first electrode and a second electrode sandwiching the electrolyte membrane. The first electrode includes a first catalyst layer and a first gas diffusion layer in this order from the electrolyte membrane side. The first gas diffusion layer includes a first fibrous conductive member and a first resin material. The first catalyst layer includes a second fibrous conductive member, catalyst particles, and a second resin material. One of the first electrode and the second electrode functions as an anode, and the other electrode functions as a cathode.

When viewed from the stacking direction of the MEA, the first angle formed by the first fibrous conductive member (hereinafter referred to as the first conductive fiber) and the main flow path of the gas supplied to the MEA is 45° or less. The first angle is the smaller angle of the angles formed by the first conductive fiber and the main flow path of the gas. The first angle is 0° or more.

Similarly, when viewed from the stacking direction of the MEA, the second angle formed by the second fibrous conductive member (hereinafter referred to as the second conductive fiber) and the main flow path is 45° or less. The second angle is the smaller angle of the angles formed by the second conductive fiber and the main flow path of the gas. The second angle is 0° or more.

The first angle is preferably 30° or less, more preferably 15° or less. This allows further improvement in gas diffusivity.

The second angle is preferably 30° or less, more preferably 15° or less. This also allows further improvement in gas diffusivity.

Preferably, when a cross section of the MEA along the main gas flow path is viewed, the first conductive fibers are oriented along the interface between the first gas diffusion layer and the first catalyst layer (hereinafter referred to as the first interface). Specifically, the first conductive fiber is preferably parallel to the interface between the first gas diffusion layer and the first catalyst layer, or inclined from the upstream side of the main flow path toward the first interface, and the first conductive fiber forms a third A angle with the first interface of 70° or less. As a result, the gas can more smoothly enter the gas diffusion layer without being obstructed by the first conductive fibers. The third A angle is the smaller angle of the angles formed by the first interface and the first conductive fiber that is parallel to the first interface or inclined from the upstream of the main flow path toward the first interface. The third A angle is 0° or more.

The third A angle formed by the first conductive fiber and the first interface is more preferably 60° or less, and particularly preferably 45° or less.

On the other hand, when a cross section of the MEA along the main gas flow path is viewed, preferably, the second conductive fiber does not extend along the first interface. Specifically, the second conductive fiber and the first interface preferably form a fourth A angle of 25° or more. As a result, the gas entering the first catalyst layer is easily diffused in the thickness direction, and can be efficiently contacted with the electrolyte membrane. On the other hand, the fourth A angle is preferably 80° or less. Thus, the bending of the second conductive fiber due to the external force applied in the thickness direction is suppressed, and the gas diffusivity is easily further improved. Further, since the penetration of the second conductive fiber into the electrolyte membrane is suppressed, the electrolyte membrane is also prevented from being damaged. The fourth A angle is the smaller angle of the angles formed by the second conductive fiber and the first interface.

The fourth A angle is, for example, 25° or more and 80° or less, more preferably 25° or more and 70° or less, and particularly preferably 25° or more and 65° or less.

It is particularly preferable that the second conductive fibers are inclined from an upstream side of the main flow path toward the first interface when the cross section of the MEA along the main gas flow path is viewed. The fourth A angle formed by the second conductive fiber and the first interface in this instance is also preferably 25° or more and 80° or less, more preferably 25° or more and 70° or less, and particularly preferably 25° or more and 65° or less.

Among these, preferably, both the first conductive fiber and the second conductive fiber are inclined from the upstream of the main flow path toward the first interface. In other words, the conductive fibers in each layer may face each other with the first interface interposed therebetween.

In a fuel cell using a proton conductive polymer electrolyte membrane as an electrolyte membrane, usually, a fuel gas or an oxidizing gas is pre-humidified by adding water vapor and then supplied to the gas diffusion layer. This is to wet the electrolyte membrane to enhance proton conductivity.

On the other hand, on the cathode side of the electrolyte membrane, water is generated by an electrochemical reaction. The generated water may block the gas diffusion path. Therefore, a study has been made to quickly discharge the produced water.

As in the present embodiment, by orienting the conductive fibers in the first gas diffusion layer and the first catalyst layer so as to face each other with the first interface interposed therebetween, it is possible to humidify the gas using the generated water. The generated water crawls up to the first interface along the second conductive fibers of the first catalyst layer. However, since the conductive fibers are orientated in the first gas diffusion layer oppositely to those in the first catalyst layer, the generated water tends to stay in the vicinity of the first interface. On the other hand, gas flows from the gas diffusion layer along the first conductive fibers. The flowing gas flows into the electrolyte membrane through the first catalyst layer while being humidified by contact with the water staying in the vicinity of the first interface. In other words, the electrolyte membrane is supplied with a humidified gas. Therefore, the gas can be directly supplied to the MEA without being humidified by an external device, that is, without passing through a humidifier. Thus, the cost and size reduction of the fuel cell can be achieved, and the fuel cell can be easily started stably. The fuel cell according to the present embodiment is particularly suitable for use in a vehicle.

The sum of the third A angle and the fourth A angle, the third A angle formed by the first interface and the first conductive fiber, being inclined from the upstream of the main flow path toward the first interface or parallel with the first interface, and the fourth A angle formed by the first interface and the second conductive fiber inclined from the upstream of the main flow path toward the first interface, is preferably 25° or more and 110° or less. Thus, the generated water tends to stay in the vicinity of the first interface, and the gas is humidified more efficiently. The sum of the third A angle and the fourth A angle is more preferably 25° or more and 90° or less, and particularly preferably 25° or more and 60° or less.

Preferably, the first conductive fibers are not along the first interface when the cross section of the MEA crossing the main gas flow path is viewed. Specifically, the first conductive fiber and the first interface preferably form a fifth A angle of 45° or more. This allows the gas entering the first gas diffusion layer to be easily diffused in the thickness direction. The fifth A angle is the smaller angle of the angles formed by the first conductive fiber and the first interface. However, the fifth A angle may be 90°.

The fifth A angle is more preferably 55° or more, and particularly preferably 60° or more.

Preferably, the second conductive fibers are also not along the first interface when the cross section of the MEA crossing the main gas flow path is viewed. Specifically, the second conductive fiber and the first interface preferably form a sixth A angle of 45° or more. As a result, the gas entering the catalyst layer is easily diffused in the thickness direction. The sixth A angle is the smaller angle of the angles formed by the second conductive fiber and the first interface. However, the sixth A angle may be 90°.

The sixth A angle is more preferably 48° or more, and particularly preferably 50° or more.

"Viewing from the stacking direction of the MEA" is synonymous with viewing from the normal direction of the main surface of the MEA. The same applies to the following other embodiments.

The "main flow path of the gas" is a flow path in the direction in which the gas flows most. The direction of the gas flowing through the entire flow path is understood from the positional relationship between the inlet and the outlet of the gas. The flow path of the gas is divided according to the direction of flow of the gas viewing from the stacking direction of the MEA. When the gas flows in the same direction through one gas flow path, the division of the gas flow path is not necessary. If the direction of flow of the gas changes at an angle of less than 90°, the division of the gas flow path is unnecessary as well, since the flow of the gas can also be considered to be the same. When there are a plurality of regions having the same gas flow, these flow path areas are added. The direction in which the gas flows most is the flow direction of the gas in which the flow path area is greatest. The region with the largest area is the main flow path of the gas. The direction of gas flow, considering the positional relationship between the inlet and outlet of the gas, can be regarded as the extending direction of the center line of the gas flow path. The center line is a line equally dividing the gas flow path to two along the direction in which the gas flows. The same applies to the following other embodiments.

Usually, the flow path of the gas is provided so as to extend generally in a direction from the inlet to the outlet of the gas. The gas flow path is formed, for example, in a parallel type or a serpentine type. The parallel type gas flow path includes a plurality of grooves extending from a side (first side) vicinity of the gas supply port of the separator or the gas diffusion layer toward the opposite side (second side). The serpentine type gas flow path includes one or more grooves extending while meandering toward the second side from the first side of the separator or the gas diffusion layer. The groove may be straight or wave-shaped.

Hereinafter, the main flow path of the gas will be described with reference to the drawings. However, the shape and arrangement of the gas flow paths are not limited to the followings.

FIG. 1A is a plan view schematically showing a gas flow path of a parallel type formed in the separator. In FIG. 1A, the separator is viewed from the stacking direction of the MEA. For convenience, the gas flow path is hatched.

A plurality of linear grooves (gas flow paths 260) are formed in the separator 240 from a first side 240a to a second side 240b. The gas flow paths 260 are substantially parallel to each other. In the plurality of gas flow paths 260, the direction of flow of the gas is the same. That is, the supplied gas all flows in the same direction A. In this case, the main flow path of the gas is all of the gas flow paths 260. The gas flows from the first side 240a toward the second side 240b. The upstream side of the main flow path is the side of the first side 240a.

FIG. 1B is a plan view schematically showing a gas flow path of the serpentine type formed in the separator. In FIG. 1B, the separator is viewed from the stacking direction of the MEA. For convenience, the gas flow path is hatched.

The separator 240 is formed with a single groove (gas flow path 260) extending from a first side 240a toward a second side 240b in a meandering manner. In the gas flow path 260, the gas flows in three directions. The three directions are direction A from the first side 240a to the second side 240b, direction B from the second side 240b to the first side 240a, and direction C crossing with direction A and direction B. The gas flow path 260 is divided into regions corresponding to the three directions (region A, region B, region C). However, the two regions, e.g., region A and region C, overlap at the corner of the flow path. One or more of each region are formed. The area of each region (if there is one or more, the total area) is determined, and the region having the largest area is the main flow path. In FIG. 1B, the main flow path is area A. In the main flow path, the gas flows in direction A. The upstream side of the main flow path is the first side 240a. When there are a plurality of regions having the largest area, any of these regions may be used as the main flow path.

The "first angle" formed by the first conductive fiber and the main flow path of the gas is obtained as follows.

First, an MEA is prepared, and the region of the main surface of the gas diffusion layer facing the main flow path of the gas is photographed by a scanning electron microscope (SEM). Three regions RP1 (e.g., 50 μm×50 μm) in which, for example, 20 or more conductive fibers can be confirmed are arbitrarily determined from the obtained SEM image. The three regions RP1 should not overlap each other. Ten identifiable conductive fibers in each region of RP1 are arbitrarily selected. A tangent line LP1 is drawn at a midpoint PP1 of observable length for each of the ten conductive fibers.

FIG. 2 is an illustration of how the tangent line of the conductive fiber is drawn with reference to the main surface of the first gas diffusion layer. One region of RP1 is shown in FIG. 2. Also, only three identifiable first conductive fibers are shown in FIG. 2. A tangent line LP1 at a midpoint PP1 of observable length is drawn for each of the plurality of first conductive fibers 131.

On the other hand, a line bisecting the main flow path determined as described above along the direction in which the gas flows is defined as the center line CL of the main flow path. When the main flow path includes a plurality of regions as described above, the center line of any one of the regions is defined as the center line CL of the main flow path, as shown in FIG. 1A.

The average value of the angles formed by the plurality of tangent lines LP1 and the center line CL of the main flow path obtained as described above (30 lines in the above case) is obtained. After the average value is calculated, the average value is calculated again excluding the data different from the obtained average value by 20% or more. The corrected average value is referred to as a "first angle". The number of the first conductive fibers to be selected is 30 or more.

The "second angle" formed by the second conductive fiber and the main flow path of the gas is also obtained in the same manner as the first angle.

First, the gas diffusion layer is removed from the MEA to expose the catalyst layer, and a region of the main surface of the catalyst layer facing the main flow path of the gas is photographed by SEM. Three regions of RP2 (e.g., 50 µm×50 µm) in which, for example, 20 or more conductive fibers can be confirmed are arbitrarily determined from the obtained SEM image. The three regions of RP2 should not overlap each other. Ten identifiable conductive fibers in each region of RP2 are arbitrarily selected. A tangent line LP2 is drawn at a midpoint PP2 of observable length for each of the ten conductive fibers.

The average value of the angles formed by the plurality of tangent lines LP2 (30 lines in the above case) and the center line CL of the main flow path obtained as described above is obtained. After the average value is calculated, the average value is calculated again excluding the data different from the obtained average value by 20% or more. This corrected average value is referred to as a "second angle". The number of the second conductive fibers to be selected is 30 or more.

The "third A angle" formed by the first conductive fiber and the first interface is obtained as follows. First, an MEA is prepared, and three cross sections along the main flow path and including the gas diffusion layer and the catalyst layer are photographed by SEM. The "cross section along the main flow path" is along the straight line forming an angle of 0° with the center line CL of the main flow path determined as described above. The "cross section along the main flow path" is synonymous with the cross section obtained by cutting the MEA in the thickness direction.

A region RS1 (e.g., 50 µm×50 µm) in which, for example, 20 or more first conductive fibers and the first interface can be confirmed is arbitrarily determined from the obtained SEM image. Separately, a region RS1 is determined one by one in the same manner for two different sections. Ten identifiable first conductive fibers in each region RS1 are arbitrarily selected. A tangent line LS1 is drawn at a midpoint PS1 of observable length part for each of the ten first conductive fibers.

Meanwhile, a straight line connecting the ends of the interface between the gas diffusion layer and the catalyst layer in the region RS1 is drawn. This straight line is defined as the first interface.

The average value of the angles formed by the plurality of tangent lines LS1 (30 lines in the above case) and the first interface obtained as described above is obtained. After the average value is calculated, the average value is calculated again excluding the data different from the obtained average value by 20% or more. The corrected average value is referred to as the "third A angle". The number of the first conductive fibers to be selected is 30 or more.

The "fourth A angle" formed by the second conductive fiber and the first interface is also obtained in the same manner as the third A angle. The region RS2 is determined one by one from three cross sections in which 10 or more second conductive fibers and the first interface can be confirmed. Five second conductive fibers are selected from each of the three regions of RS2, and a tangent line LS2 is drawn. The average value of the angles formed by the plurality of tangent lines LS2 (in the above case, 15) and the first interface is obtained. After the average value is calculated, the average value is calculated again excluding the data different from the obtained average value by 20% or more. The corrected average value is referred to as the "fourth A angle". The number of the second conductive fibers to be selected is 15 or more.

The "fifth A angle" formed by the first conductive fiber and the first interface is obtained in the same manner as the third A angle, except that the cross section crossing the main flow path is photographed by SEM.

The "sixth A angle" formed by the second conductive fiber and the first interface is obtained in the same manner as the fourth A angle, except that the cross section crossing the main flow path is photographed by SEM.

The "cross section crossing the main flow path" is along the straight line forming an angle of 90° with the center line CL of the main flow path determined as described above. The "cross section crossing the main flow path" is synonymous with the cross section obtained by cutting the MEA in the thickness direction.

That the first conductive fiber is inclined toward the first interface from the upstream of the main flow path" is synonymous with that an end of the first conductive fiber at the downstream side of the main flow path being closer to the first interface than an end thereof of the upstream side.

That the second conductive fiber is inclined toward the first interface from the upstream of the main flow path" is synonymous with that an end of the second conductive fiber at the downstream side of the main flow path being closer to the first interface than an end thereof of the upstream side.

The third A angle formed by the first interface and the first conductive fiber, being parallel to the first interface or inclined from the upstream of the main flow path toward the first interface, is determined as described above, by selecting ten first conductive fibers from the three regions RS1 determined as described above, the first conductive fibers being parallel to the first interface or inclined from the upstream of the main flow path toward the first interface.

The fourth A angle formed by the second conductive fibers inclined from the upstream of the main flow path toward the first interface and the first interface is similarly calculated using the second conductive fibers being inclined from the upstream of the main flow path toward the first interface selected from the three regions RS2.

Preferably, the first conductive fiber and the second conductive fiber are arranged in each layer in a state in which the linearity is ensured. The term "the linearity is ensured" means that the conductive fiber is not greatly bent, and the linearity R obtained by the method described later is 0.6 or more. In view of gas diffusivity, preferably, the linearity R is 0.7 or more.

The linearity R1 of the first conductive fiber is obtained from the three regions RS1 determined as described above as follows. Ten identifiable first conductive fibers in each region RS1 are arbitrarily selected. For the ten first conductive fibers, one end and the other end of the observable length portion are connected by a straight line, and the length Ls of the straight line is obtained. Also, for the same ten first conductive fibers, the actual length Lr of the observable length portion is determined. For the plurality of first conductive fibers (30 in the above case), the average value of the ratio of Ls to Lr:Ls/Lr is obtained. After the average value is calculated, the average value is calculated again excluding the data different from the obtained average value by 20% or more. The corrected average value is referred to as a linearity R1. The number of the first conductive fibers to be selected is 30 or more. The linearity R2 of the second conductive fiber is also obtained from the three regions RS2 in the same manner. The number of the second conductive fibers to be selected is 15 or more.

Next, the first gas diffusion layer and the first catalyst layer according to the present embodiment will be described in detail with reference to the drawings. However, the first gas diffusion layer and the first catalyst layer according to the present embodiment are not limited thereto.

FIG. 3 is a schematic plan view of the first gas diffusion layer viewed from the stacking direction of the MEA. In FIG. 3, the first angle is illustrated for convenience, and the first angle is calculated by the calculation method described above. The first gas diffusion layer 130A includes first conductive fibers 131 oriented along direction A. The first angle θ1 formed by the main flow path of the gas (direction A) and the first conductive fiber 131 is 45° or less.

FIG. 4 is a schematic plan view of the first catalyst layer viewed from the stacking direction of the MEA. In FIG. 4, the second angle is illustrated for convenience, and the second angle is calculated by the calculation method described above. The first catalyst layer 120A includes second conductive fibers 121 oriented along direction A. The second angle θ2 formed by the main flow path of the gas (direction A) and the second conductive fiber 121 is 45° or less.

FIG. 5 is a schematic cross sectional view taken along the main flow path of the MEA. This cross sectional view corresponds to a cross section of the MEA taken along line X-X in FIG. 7, but only the first gas diffusion layer and the first catalyst layer are shown for convenience. In FIG. 5, the third A angle and fourth A angle are illustrated for convenience, and these are calculated by the above-described calculation method.

The first conductive fiber 131 is oriented generally along direction A also in a cross section along the main flow path. The first conductive fiber 131 is gently inclined toward the first interface S from the upstream of the main flow path. The third A angles θ3 formed by the first conductive fibers 131 and the first interface S are, for example, 70° or less.

On the other hand, the second conductive fiber 121, in a cross section along the main flow path, is oriented generally along thickness direction Z. The second conductive fiber 121 is inclined toward the first interface S from the upstream of the main flow path. The fourth A angle θ4 formed by the second conductive fiber 121 and the first interface S is, for example, 25° or more.

Both the first conductive fiber 131 and the second conductive fiber 121 are inclined from an upstream of the main flow path toward the first interface S. At this time, the sum of the third A angle θ3 and the fourth A angle θ4 is, for example, 25° or more and 110° or less.

FIG. 6 is a schematic sectional view taken along a direction crossing the main flow path of the MEA. This cross sectional view corresponds to a cross section of the MEA taken along line Y-Y in FIG. 7, but only the first gas diffusion layer and the first catalyst layer are shown for convenience.

In FIG. 6, fifth A angle and sixth A angle are illustrated for convenience, and these are calculated by the above-described calculation method.

The first conductive fiber 131 is oriented generally along the thickness direction Z in a cross section crossing the main flow path. The fifth A angle θ5 formed by the first conductive fibers 131 and the first interface S are, for example, 45° or more.

The second conductive fibers 121 are also generally oriented along the thickness direction Z in a cross section crossing the main flow path. The sixth A angle θ6 formed by the second conductive fiber 121 and the first interface S is, for example, 45° or more.

a. First Gas Diffusion Layer

The first gas diffusion layer includes a first conductive fiber and a first resin material. A microporous layer having conductivity is thus made.

The first gas diffusion layer constitutes at least one of a cathode gas diffusion layer and an anode gas diffusion layer of the fuel cell. The MEA may include a gas diffusion layer according to the present embodiment in the cathode and the anode.

The first gas diffusion layer may further include a substrate layer. The first gas diffusion layer having the substrate layer has, for example, a substrate layer and the microporous layer provided thereon on the catalyst layer side. As the substrate layer, a conductive porous sheet such as a carbon cloth or carbon paper can be used.

The thickness of the first gas diffusion layer desirably is thin, considering the size reduction of the fuel cell. On the other hand, in view of strength, preferably, the first gas diffusion layer is not excessively thin. The thickness of the first gas diffusion layer is, for example, 30 μm or more and 1000 μm or less, preferably 50 μm or more and 500 μm or less.

The thickness of the first gas diffusion layer is an average thickness, and it is obtained by averaging distances obtained by drawing a straight line along the thickness direction of the first gas diffusion layer from one main surface to the other main surface for any ten locations in the cross section of the first gas diffusion layer.

(First Conductive Fiber)

The first conductive fiber has an aspect ratio of 2 or more and is conductive. The aspect ratio of the first conductive fiber may be 3 or more, or may be 5 or more. The aspect ratio of the first conductive fiber may be 1000 or less, 500 or less, or 100 or less. The aspect ratio of the first conductive fiber is, for example, 3 or more and 1000 or less. The aspect ratio of the first conductive fiber is a ratio of the average length L1 to the average diameter R1 of the first conductive fiber.

The first conductive fibers include, for example, fibrous carbon materials such as vapor grown carbon fibers (VGCF®), single or multilayered carbon nanotubes (CNTs), and carbon nanofibers. The first conductive fiber may have a hollow space (hollow portion) inside. Both ends of the first conductive fiber in the longitudinal direction may be open.

As the first conductive fiber, two or more types of conductive fibers having different materials, average diameters and/or average lengths may be mixed and used. For example, the first conductive fiber may include single layer carbon nanotubes (0.3 to 3 nm in diameter, 10 μm or less in fiber length) and multiple layered carbon nanotubes (5 to 200 nm in diameter, 20 μm or less in fiber length).

The average diameter R1 of the first conductive fibers is not particularly limited. The average diameter R1 may be 0.3 nm or more, may be 3 nm or more, or may be 20 nm or more. The average diameter R1 may be 300 nm or less, may be 250 nm or less, or may be 200 nm or less. When the average diameter R1 is in this range, the volume ratio of the first conductive fibers in the first gas diffusion layer is reduced, and a sufficient gas path can be easily secured.

The average diameter R1 of the first conductive fibers is obtained by arbitrarily taking out 10 first conductive fibers from the first gas diffusion layer and averaging diameters thereof. The diameter is a length in a direction perpendicular to the length direction of the first conductive fiber. The average diameter R2 of the second conductive fiber is also obtained in the same manner.

The average length L1 of the first conductive fibers is not particularly limited. The average length L1 of the first conductive fibers may be, for example, 0.2 μm or more, or may be 0.5 μm or more. The average length L1 of the first conductive fibers may be, for example, 20 μm or less, or may be 10 μm or less. When the average length L1 is in this range, the first conductive fiber is easily oriented in a desired direction, and the gas diffusivity is easily improved.

The average length L1 of the first conductive fibers is obtained by arbitrarily taking out 10 first conductive fibers from the first gas diffusion layer and averaging the fiber lengths of these first conductive fibers. The above-mentioned fiber length is a length when one end and the other end of the taken-out conductive fiber are pulled so as to be straight. The average length L2 of the second conductive fiber is also obtained in the same manner.

The mass ratio of the first conductive fibers in the first gas diffusion layer is not particularly limited. The mass ratio of the first conductive fiber is desirably high, in view of easily securing of sufficient gas diffusion. On the other hand, when the mass ratio of the first conductive fiber is excessively high, the film thickness of the first gas diffusion layer becomes excessively thick, and the electron transfer resistance tends to increase. Considering the above, the mass ratio of the first conductive fiber in the first gas diffusion layer may be 10 mass % or more and 90 mass % or less, and may be 20 mass % or more and 75 mass % or less.

(First Resin Material)

The first resin material has a function as a binder for binding the first conductive fibers together. The mass ratio of the first resin material in the first gas diffusion layer may be 5 mass % or more and 50 mass % or less, or may be 10 mass % or more and 40 mass % or less.

In view of suppressing the accumulation of water in the first gas diffusion layer, preferably, 50 mass % or more, and even 90 mass % or more of the first resin material is a water-repellent resin. The first resin material may further include a proton conductive resin (polymer electrolyte).

Examples of the water-repellent resin include fluororesin.

Examples of the fluororesin include PTFE (polytetrafluoroethylene), FEP (tetrafluoroethylene-hexafluoropropylene copolymer), PVdF (polyvinylidene fluoride), ETFE (tetrafluoroethylene-ethylene copolymer), PCTFE (polychlorotrifluoroethylene), and PFA (tetrafluoroethylene-perfluoroalkylvinylether copolymer). Among these, preferably, fluororesin is PTFE, in view of thermal resistance, water repellency, and chemical resistance.

The proton conductive resin is not particularly limited. Examples of the proton conductive resin include a perfluorocarbon sulfonic acid-based polymer and a hydrocarbon-based polymer. Among these, a perfluorocarbon sulfonic acid-based polymer or the like is preferable because it has excellent heat resistance and chemical stability. As the perfluorocarbon sulfonic acid-based polymer, for example, Nafion® can be used.

(Other)

The first gas diffusion layer may include a particulate conductive member, a plate-shaped conductive member, or the like as a conductive material. Specific examples of the plate-like conductive member include scaly graphite, graphitized polyimide film pulverized product, graphene, and the like. Among them, the graphitized polyimide film pulverized product or graphene tends to be oriented in the plane direction, is advantageous for forming the first gas diffusion layer thinly, and is suitable for enhancing the gas diffusivity in the plane direction.

The mass ratio of the plate-shaped conductive member in the first gas diffusion layer is not particularly limited. Among them, in view of gas diffusivity, the mass ratio in the first gas diffusion layer of the plate-shaped conductive member may be 20 mass % or less, or may be 10 mass % or less.

The particulate conductive member has an aspect ratio of less than 2 and is electrically conductive. The particulate conductive member is not particularly limited, and examples thereof include carbon black, spherical graphite, and activated carbon. Of these, carbon black is preferred in terms of high conductivity and large pore volume. Examples of carbon black include acetylene black, Ketjen black, thermal black, furnace black, channel black, and the like. The particle size (or the length of the structure composed of a plurality of primary particles connected) is not particularly limited, and can be the one used usually in the first gas diffusion layer of a fuel cell.

The mass ratio of the particulate conductive member in the first gas diffusion layer is not particularly limited. Among them, in view of gas diffusivity, the mass ratio in the first gas diffusion layer of the particulate conductive member may be 20 mass % or less, or may be 10 mass % or less.

(Production Method of First Gas Diffusion Layer)

The first gas diffusion layer is obtained, for example, by molding a mixture containing a conductive member such as a first conductive fiber, a first resin material, and a dispersion medium into a sheet shape and firing the sheet.

As the dispersion medium, for example, water, ethanol, propanol, and the like can be used. For the molding, for example, rolling by a roll press or the like is used. The orientation of the first conductive fiber can be adjusted by changing, in addition to the length, for example, the speed and pressure of rolling, the viscosity of the mixture, and the like.

The molded sheet may be fired. After firing, the sheet may be further rolled. For the rolling after firing, a mold having a rib of a predetermined gas flow path pattern may be used. As a result, a gas flow path can be formed in the first gas diffusion layer. The gas flow path may also be formed by cutting the main surface of the sheet after firing.

(Gas Flow Path)

A gas flow path may be formed in the first gas diffusion layer. The gas flow path may be formed in the separator.

The fibrous conductive members of the gas diffusion layer and the catalyst layer according to the present embodiment are oriented along the main flow path of the gas. Therefore, according to the present embodiment, the gas diffusivity can be further improved in the case where the interval between the plurality of gas flow paths is relatively small. The interval between the gas flow paths is not particularly limited, but may be, for example, 0.5 to 2 times the width of the gas flow path. The width of the gas flow path is the length of the gas flow path in a direction perpendicular to the flow of the gas. Specifically, the interval between the gas flow paths may be 0.3 mm or more and 5 mm or less.

b. First Catalyst Layer

The first catalyst layer includes a second conductive fiber, catalyst particles, and a second resin material.

The first catalyst layer constitutes at least one of a cathode catalyst layer and an anode catalyst layer of the fuel cell. During the power generation of the fuel cell, water is generated at the cathode. According to this embodiment, since the gas diffusivity is improved, the first catalyst layer is particularly suitable as a cathode catalyst layer. In addition, the first catalyst layer is suitable as a cathode catalyst layer in that the gas can be humidified by utilizing the generated water. In addition to the cathode, the MEA may also include an anode with the catalyst layer according to the present embodiment.

In view of size reduction of the fuel cell, desirably, the thickness of the first catalyst layer is thin, but in view of strength, preferably, the thickness is not too small. The thickness of the catalyst layer is, for example, 1 µm or more and 50 µm or less, and preferably 2 µm or more and 20 µm or less.

The thickness of the first catalyst layer is an average thickness, and is obtained by averaging distances obtained by drawing a straight line along the thickness direction of the first catalyst layer from one main surface to the other main surface for any ten points in the cross section of the first catalyst layer.

(Second Conductive Fibers)

The second conductive fiber has an aspect ratio of 2 or more and is conductive. As the second conductive fiber, the materials given as examples for the first conductive fiber are used.

The average diameter R2 of the second conductive fibers is not particularly limited. The average diameter R2 may be 0.3 nm or more, may be 3 nm or more, or may be 20 nm or more. The average diameter R2 may be 300 nm or less, 250 nm or less, or 200 nm or less. When the average diameter R2 is in this range, the volume ratio of the second conductive fibers in the first catalyst layer is reduced, and a sufficient gas path can be easily secured.

The average length L2 of the second conductive fiber is not particularly limited. The average length L2 of the second conductive fibers may be, for example, 0.2 µm or more, or may be 0.5 µm or more. The average length L2 of the second conductive fibers may be, for example, 20 µm or less, or may be 10 µm or less. When the average length L2 is in this range, the second conductive fiber is easily oriented in a desired direction, and the gas diffusivity is easily improved. In addition, both ends of the second conductive fiber are prevented from contacting the electrolyte membrane and the first gas diffusion layer, thereby preventing damage.

The content of the second conductive fiber in the first catalyst layer is preferably 1 mass % or more and 85 mass % or less, and more preferably 5 mass % or more and 75 mass % or less. This is because the second conductive fiber is easily disposed in a desired state, so that the gas diffusivity and efficiency of the electrochemical reaction tends to increase.

(Catalyst Particles)

A portion of the catalyst particles may be supported on the second conductive fiber. The reason is that the catalyst particles can more easily come into contact with gas, which increases the efficiency of oxidation reaction or reduction reaction of the gas.

The catalyst particles are not particularly limited, and may be made of a catalyst metal such as an alloy or a metal element selected from Sc, Y, Ti, Zr, V, Nb, Fe, Co, Ni, Ru, Rh, Pd, Pt, Os, Ir, lanthanoid elements, and actinoid elements. For example, catalyst particles used for anodes include Pt—Ru alloys and the like. Catalytic metals used for the cathode include Pt, Pt—Co alloys, and the like.

(Second Resin Material)

The second resin material has a function as a binder for binding the second conductive fibers together. In view of improving reactivity, preferably, the second resin material contains the above-mentioned proton conductive resin. In this case, the proton conductive resin coats at least a portion of the second conductive fiber and the catalyst particles.

The proton conductive resin is preferably contained in an amount of 50 parts by mass or more and 200 parts by mass or less relative to 100 parts by mass of the conductive member (total of the second conductive fibers and the particulate conductive member, etc.) contained in the first catalyst layer carrying the catalyst particles.

(Production Method of First Catalyst Layer)

The first catalyst layer can be formed, for example, by applying a catalyst ink containing a conductive member such as a second conductive fiber, catalyst particles, a second resin material, and the above-mentioned dispersion medium on an electrolyte film and drying them. Alternatively, the catalyst ink may be applied to the substrate sheet for transfer and dried to form the first catalyst layer. The formed first catalyst layer is transferred to an electrolyte membrane.

As the substrate sheet, a sheet with a smooth surface made of, for example, polyethylene terephthalate (PET), polypropylene or the like is preferably used.

As the application method, it is preferable to use a screen printing method or a coating method that uses any type of coater such as a blade coater, a knife coater, or a gravure coater. The orientation of the second conductive fiber can be adjusted by changing, in addition to its length, for example, the amount of the catalyst ink applied, the coating speed, the viscosity, and the like.

[Fuel Cell]

The fuel cell according to the present embodiment includes an MEA, and a first separator and a second separator sandwiching the MEA. Since the above MEA is excellent in gas diffusivity, the fuel cell containing this MEA is excellent in output characteristics.

The first separator may have a gas flow path. The gas is supplied to the MEA from the gas flow path. The fuel cell may further include a frame-shaped sealing member surrounding the periphery of the MEA in a loop.

c. Separator

It is sufficient that the first separator and the second separator are gas-tight, electron conductive and electrochemically stable. The materials of the first separator and the second separator are not particularly limited. As the materials, it is preferable to use a carbon material, a metal material, and the like. The metal material may be covered with carbon. For example, each of the first separator and the second separator can be obtained by, for example, punching out a metal plate into a predetermined shape and performing a surface treatment on the obtained metal plate.

d. Sealing Member

The sealing member is a material having elasticity to prevent gas from leaking to the outside of the fuel cell. The sealing member has, for example, a frame-like shape so as to surround the peripheral edges of the pair of catalyst layers in a loop shape. As the sealing member, a known material and a known structure can be employed.

Next, the fuel cell according to the present embodiment will be described in detail with reference to the drawings. However, the fuel cell according to the present embodiment is not limited to this.

FIG. 7 is an exploded perspective view showing components of a unit cell disposed in the fuel cell according to the present embodiment. Usually, a plurality of unit cells are stacked and arranged as a cell stack in a fuel cell. For the sake of convenience, FIG. 7 shows only one unit cell.

The fuel cell (unit cell) 200 includes an MEA 100, and a first separator 240A and a second separator 240B sandwiching the MEA 100. The MEA 100 includes an electrolyte membrane 110, a first catalyst layer 120A and a second catalyst layer 120B disposed so as to sandwich the electrolyte membrane 110, and a first gas diffusion layer 130A and a second gas diffusion layer 130B disposed so as to sandwich the electrolyte membrane 110 via the first catalyst layer 120A and the second catalyst layer 120B, respectively.

Parallel gas flow paths 260A and 260B are formed in the first separator 240A and the second separator 240B, respectively. Each of the gas flow paths 260A and 260B includes three grooves. The gas flows in direction A inside the gas flow paths 260A and 260B. The shape, arrangement, and the like of the gas flow path are not limited thereto. If the separator does not have a gas flow path, a gas flow path may be formed on the surface facing the separator of the corresponding gas diffusion layer.

In the first catalyst layer 120A, the second conductive fibers 121 oriented along direction A are disposed. In the first gas diffusion layer 130A, the first conductive fibers 131 oriented along direction A are disposed. The second catalyst layer 120B and the second gas diffusion layer 130B are also provided with conductive fibers that are oriented along direction A, but are not limited thereto. The second catalyst layer 120B and the second gas diffusion layer 130B may be of a known material and a known configuration.

Second Embodiment

Each of the gas diffusion layer and the catalyst layer according to the present embodiment includes a fibrous conductive member. In the present embodiment, the fibrous conductive member of the gas diffusion layer is oriented so as to cross the main flow path of the gas. As a result, the gas is diffused along the fibrous conductive member in a direction crossing with the main flow path. On the other hand, in the catalyst layer, the fibrous conductive member is oriented in a direction different from that of the gas diffusion layer, that is, along the main flow path. Therefore, the gas diffused in the direction crossing the main flow path diffuses in the direction along the main flow path in the catalyst layer. As a result, the gas diffusivity in the electrode is improved. The membrane electrode assembly according to the present embodiment is particularly useful for a fuel cell having a plurality of gas flow paths with relatively large intervals.

[Membrane Electrode Assembly]

The membrane electrode assembly (MEA) according to the present embodiment includes an electrolyte membrane and a first electrode and a second electrode sandwiching the electrolyte membrane. The first electrode includes a first catalyst layer and a first gas diffusion layer in this order from the electrolyte membrane side. The first gas diffusion layer includes a first fibrous conductive member and a first resin material. The first catalyst layer includes a second fibrous conductive member, catalyst particles, and a second resin material. One of the first electrode and the second electrode functions as an anode, and the other electrode functions as a cathode.

When viewed from the stacking direction of the MEA, the first angle formed by the first fibrous conductive member (first conductive fiber) and the main flow path of the gas supplied to the MEA is larger than 45°. The first angle is the smaller angle of the angles formed by the first conductive fiber and the main flow path of the gas. However, the first angle may be 90°.

On the other hand, when viewed from the stacking direction of the MEA, the second angle formed by the second fibrous conductive member (second conductive fiber) and the main flow path is 45° or less. The second angle is the smaller angle of the angles formed by the second conductive fiber and the main flow path of the gas. The second angle is 0° or more.

The first angle is preferably greater than 60° and more preferably greater than 75°. This allows further improvement in gas diffusivity.

The second angle is preferably 30° or less, more preferably 15° or less. This also allows further improvement in gas diffusivity.

Preferably, the first conductive fibers are oriented in a direction along the interface between the first gas diffusion layer and the first catalyst layer, hereinafter referred to as the first interface, when the cross section of the MEA crossing the main gas flow path is viewed. Specifically, the third B angle formed by the first conductive fiber and the first interface is preferably less than 45°. This makes it easier for the gas entering the first gas diffusion layer to diffuse further in the direction crossing the main flow path of the gas. As a result, the gas diffusivity in the electrode is further improved. The third B angle is the smaller angle of the angles formed by the first conductive fiber and the first interface. The third B angle is 0° or more.

The third B angle is more preferably less than 30°, and particularly preferably less than 15°.

On the other hand, preferably, the second conductive fiber does not extend along the first interface when the cross section of the MEA crossing the main gas flow path is viewed. Specifically, preferably, the second conductive fiber and the first interface form a fourth B angle of 45° or more. As a result, the gas entering the catalyst layer is easily diffused in the thickness direction. The fourth B angle is the smaller angle of the angles formed by the second conductive fiber and the first interface. However, the fourth B angle may be 90°.

The fourth B angle is more preferably 60° or more, and particularly preferably 75° or more.

Preferably, the first conductive fibers are not oriented along the first interface when the cross section of the MEA along the main gas flow path is viewed. Specifically, preferably, the first conductive fiber and the first interface form a fifth B angle of 45° or more. As a result, the gas is easily diffused in the thickness direction of the gas diffusion layer. The fifth B angle is the smaller angle of the angles formed by the first conductive fiber and the first interface. However, the fifth B angle may be 90°.

The fifth B angle formed by the first conductive fiber and the first interface is more preferably 60° or more, and particularly preferably 75° or more.

Preferably, the second conductive fiber does not extend along the first interface when the cross section of the MEA along the main gas flow path is viewed. Specifically, preferably, the second conductive fiber and the first interface form a sixth B angle of 25° or more. As a result, the gas entering the first catalyst layer is easily diffused in the thickness direction, and can be efficiently contacted with the electrolyte membrane. On the other hand, the sixth B angle is preferably 80° or less. Thus, the bending of the second conductive fiber due to the external force applied in the thickness direction is suppressed, and the gas diffusivity is easily further improved. Further, since the penetration of the second conductive fiber into the electrolyte membrane is suppressed, the electrolyte membrane is also prevented from being damaged. The sixth B angle is the smaller angle of the angles formed by the second conductive fiber and the first interface.

The sixth B angle is, for example, 25° or more and 80° or less, more preferably 25° or more and 70° or less, and particularly preferably 25° or more and 65° or less.

The main flow path of the gas is as described in the first embodiment, but the shape and arrangement of the gas flow path are not limited to this.

The "first angle" formed by the first conductive fiber and the main flow path of the gas is obtained in the following manner as in the first embodiment.

First, an MEA is prepared, and the region facing the main flow path of the gas of the main surface of the gas diffusion layer is photographed by a scanning electron microscope (SEM). Three regions RP1 (e.g., 50 μm×50 μm) in which, for example, 20 or more conductive fibers can be confirmed are arbitrarily determined from the obtained SEM image. The three regions RP1 should not overlap each other. Ten identifiable conductive fibers in each region RP1 are arbitrarily selected. A tangent line LP1 is drawn at a midpoint PP1 of observable length part for each of the ten conductive fibers.

FIG. 8 is an illustration of how the tangent line of the conductive fiber is drawn with reference to the main surface of the first gas diffusion layer. One region RP1 is shown in FIG. 8. Also, only three identifiable first conductive fibers are shown in FIG. 8. A tangent line LP1 at a midpoint PP1 of observable length part is drawn for each of the plurality of first conductive fibers 131.

On the other hand, a line bisecting the main flow path determined as described above along the direction in which the gas flows is defined as the center line CL of the main flow path. When the main flow path includes a plurality of regions as described above, the center line of any one of the regions is defined as the center line CL of the main flow path, as shown in FIG. 1A.

The average value of the angles formed by the plurality of tangent lines LP1 and the center line CL of the main flow path obtained as described above (30 lines in the above case) is obtained. After the average value is calculated, the average value is calculated again excluding the data different from the obtained average value by 20% or more. The corrected average value is referred to as a "first angle". The number of the first conductive fibers to be selected is 30 or more.

The "second angle" formed by the second conductive fiber and the main flow path of the gas is also obtained in the same manner as the first angle. First, the gas diffusion layer is removed from the MEA to expose the catalyst layer, and a region of the main surface of the catalyst layer facing the main flow path of the gas is photographed by SEM. Three regions RP2 (e.g., 50 μm×50 μm) in which, for example, 20 or more conductive fibers can be confirmed are arbitrarily determined from the obtained SEM image. The three regions RP2 should not overlap each other. Ten identifiable conductive fibers in each region RP2 are arbitrarily selected. A tangent line LP2 is drawn at a midpoint PP2 of observable length part for each of the ten conductive fibers.

The average value of the angles formed by the plurality of tangent lines LP2 (30 lines in the above case) and the center line CL of the main flow path obtained as described above is obtained. After the average value is calculated, the average value is calculated again excluding the data different from the obtained average value by 20% or more. This corrected average value is referred to as the "second angle". The number of the second conductive fibers to be selected is 30 or more.

The "third B angle" formed by the first conductive fiber and the first interface is obtained as follows. First, an MEA is prepared, and three cross sections crossing the main flow path and including a gas diffusion layer and a catalyst layer are photographed by SEM. The "cross section crossing the main flow path" is along the straight line forming an angle of 90° with the center line CL of the main flow path determined as described above. The "cross section crossing the main flow path" is synonymous with the cross section obtained by cutting the MEA in the thickness direction.

A region RS1 (e.g., 50 μm×50 μm) in which, for example, 20 or more first conductive fibers and the first interface can be confirmed is arbitrarily determined from the obtained SEM image. Separately, the region RS1 is determined one by one in the same manner for two different sections. Ten identifiable first conductive fibers in each region RS1 are arbitrarily selected. A tangent line LS1 is drawn at a midpoint PS1 of observable length part for each of the ten first conductive fibers.

Meanwhile, a straight line connecting the ends of the interface between the gas diffusion layer and the catalyst layer in the region RS1 is drawn. This straight line is defined as the first interface.

The average value of the angles formed by the plurality of tangent lines LS1 (30 lines in the above case) and the first interface obtained as described above is obtained. After the average value is calculated, the average value is calculated again excluding the data different from the obtained average value by 20% or more. The corrected average value is referred to as the "third B angle". The number of the first conductive fibers to be selected is 30 or more.

The "fourth B angle" formed by the second conductive fiber and the first interface is also obtained in the same manner as the third B angle. The region RS2 is determined one by one from three cross sections in which 10 or more second conductive fibers and the first interface can be confirmed. Five second conductive fibers are selected from each of the three regions RS2, and a tangent LS2 is drawn. The average value of the angles formed by the plurality of tangent lines LS2 (in the above case, 15) and the first interface is obtained. After the average value is calculated, the average value is calculated again excluding the data different from the obtained average value by 20% or more. The corrected average value is referred to as the "fourth B angle". The number of the second conductive fibers to be selected is 15 or more.

The "fifth B angle" formed by the first conductive fiber and the first interface is obtained in the same manner as the third B angle, except that the cross section along the main flow path is photographed by SEM.

The "sixth B angle" formed by the second conductive fiber and the first interface is obtained in the same manner as the fourth B angle, except that the cross section along the main flow path is photographed by SEM.

The "cross section along the main flow path" is along the straight line forming an angle of 0° with the center line CL of the main flow path determined as described above. The "cross section along the main flow path" is synonymous with the cross section obtained by cutting the MEA in the thickness direction.

That second conductive fiber is inclined toward the first interface from the upstream of the main flow path is synonymous with that an end of the second conductive fiber at the downstream side of the main flow path being closer to the first interface than the end thereof of the upstream side.

Preferably, the first conductive fiber and the second conductive fiber are arranged in each layer in a state in which the linearity is ensured. The term "the linearity is ensured" means that the conductive fiber is not greatly bent, and the linearity R obtained by the method described later is 0.6 or more. In view of gas diffusivity, preferably, the linearity R is 0.7 or more.

The linearity R1 of the first conductive fiber is obtained from the three regions RS1 determined as described above in the same manner as in the first embodiment.

Next, the first gas diffusion layer and the first catalyst layer according to the present embodiment will be described in detail with reference to the drawings. However, the first gas diffusion layer and the first catalyst layer according to the present embodiment are not limited thereto.

FIG. 9 is a schematic plan view of the first gas diffusion layer viewed from the stacking direction of the MEA. In FIG. 9, the first angle is illustrated for convenience, and the first angle is calculated by the calculation method described above. The first gas diffusion layer 130A includes first conductive fibers 131 oriented to cross direction A. The first angle θ1 formed by the first conductive fiber 131 and the main flow path of the gas (direction A) is larger than 45°.

FIG. 10 is a schematic plan view of the first catalyst layer viewed from the stacking direction of the MEA. Although the second angle is illustrated in FIG. 10 for convenience, the second angle is calculated by the calculation method described above. The first catalyst layer 120A includes second conductive fibers 121 oriented along direction A. The second angle θ2 formed by the second conductive fiber 121 and the main flow path of the gas (direction A) is 45° or less.

FIG. 11 is a schematic sectional view taken along a direction crossing the main flow path of the MEA. This cross sectional view corresponds to the view in which the MEA is cut along line Y-Y in FIG. 13, but only the first gas diffusion layer and the first catalyst layer are shown for convenience. In FIG. 11, third B angle and fourth B angle are illustrated for convenience, and these are calculated by the above-described calculation method.

The first conductive fiber 131 is oriented generally along direction A in a cross section crossing the main flow path. The third B angle θ3 formed by the first conductive fibers 131 and the first interface S is, for example, less than 45°.

On the other hand, the second conductive fiber 121 is oriented generally along the thickness direction Z in a cross section crossing the main flow path. The fourth B angle θ4 formed by the second conductive fiber 121 and the first interface S is, for example, 45° or more.

FIG. 12 is a schematic cross sectional view taken along the main flow path of the MEA. This cross sectional view corresponds to the view in which the MEA is cut along line X-X in FIG. 13, but only the first gas diffusion layer and the first catalyst layer are shown for convenience. In FIG. 12, fifth B angle and sixth B angle are illustrated for convenience, and these are calculated by the above-described calculation method.

The first conductive fiber 131 is oriented generally along the thickness direction Z in a cross section along the main flow path. The fifth B angle θ5 formed by the first conductive fibers 131 and the first interface S is, for example, 45° or more.

The second conductive fiber 121 is also generally oriented along thickness direction Z in a cross section along the main flow path. The sixth B angle θ6 formed by the second conductive fiber 121 and the first interface S is, for example, 25° or more.

a. First Gas Diffusion Layer

The first gas diffusion layer is the same as in the first embodiment, except that the first angle formed by the first conductive fiber and the main flow path of the gas is larger than 45°.

A gas flow path may be formed in the first gas diffusion layer. The gas flow path may be formed in the separator.

The fibrous conductive member of the gas diffusion layer according to the present embodiment is oriented so as to cross the main flow path of the gas. Therefore, the present embodiment can further improve the gas diffusivity in the case where the interval between the plurality of gas flow paths is relatively large. The interval between the gas flow paths is not particularly limited, but may be, for example, 0.5 to 3 times the width of the gas flow path. The width of the gas flow path is the length of the gas flow path in a direction perpendicular to the flow of the gas. Specifically, the interval between the gas flow paths may be 0.3 mm or more and 7.5 mm or less.

b. First Catalyst Layer

The first catalyst layer is the same as that of the first embodiment, and can be produced in the same manner.

[Fuel Cell]

The fuel cell according to the present embodiment is the same as that of the first embodiment, except for the following points. Since the above MEA is excellent in gas diffusivity, the fuel cell containing this MEA is excellent in output characteristics.

FIG. 13 is an exploded perspective view showing components of a unit cell disposed in the fuel cell according to the present embodiment. Usually, a plurality of unit cells are stacked and arranged as a cell stack in a fuel cell. For the sake of convenience, FIG. 13 shows only one unit cell.

In the first catalyst layer 120A, the second conductive fibers 121 oriented along direction A are disposed. In the first gas diffusion layer 130A, the first conductive fibers 131 oriented so as to cross direction A is disposed. The conductive fibers oriented along direction A are also disposed in the second catalyst layer 120B, and conductive fibers oriented so as to cross direction A are also disposed in the second gas diffusion layer, but the present invention is not limited thereto. The second catalyst layer 120B and the second gas diffusion layer 130B may be of a known material and a known configuration.

Hereinafter, the present invention will be described in detail based on examples. However, the present invention is not limited to the following examples.

Example of First Embodiment

Example 1

(1) Production of MEA
(1-1) Production of Gas Diffusion Layer

After mixing a first conductive fiber and an appropriate amount of ethanol in a mixer, PTFE was further added and mixed to obtain a mixture. CNT having an average diameter of 150 nm and an average length of 6 μm was used as the first conductive fiber. The resulting mixture was formed into a sheet using a roll press. Thereafter, baking was performed to obtain a baked sheet from which ethanol was removed. The baked sheet was further rolled to adjust the thickness to 200 μm. The resulting sheet was cut into desired shapes to obtain a gas diffusion layer for a cathode. The mass ratio of the first conductive fiber in the first gas diffusion layer was 60 mass %.

Separately, a sheet of carbon paper was prepared as a gas diffusion layer for an anode.

(1-2) Preparation of Catalyst Ink

The second conductive fiber and the particulate conductive member (carbon black) carrying the catalyst particles (Pt—Co alloys) was added to an appropriate amount of water and then stirred to be dispersed. As the second conductive fiber, CNT having an average diameter of 150 nm and an average length of 6 µm was used. After adding an appropriate amount of ethanol while stirring the obtained dispersion, 80 parts by mass of a proton-conductive resin (Nafion®) was added to 100 parts by mass of the particulate conductive member carrying 30 parts by mass of the catalyst particles. Thus, a catalyst ink for the cathode side catalyst layer was prepared.

A catalyst ink for an anode side catalyst layer was prepared in the same manner as in the catalyst ink for the cathode side catalyst layer.

(1-3) Stacking Layers

The catalyst ink for the cathode side catalyst layer was applied on polyethylene terephthalate (PET) with a blade coater with a uniform thickness, and dried to form a cathode side catalyst layer (thickness: 6 µm). At this time, the catalyst ink was applied in one direction from one side to the other side of opposite sides of the rectangular PET. The application amount of the catalyst ink was adjusted such that the thickness of the formed catalyst layer was 6 µm. The mass ratio of the second conductive fiber in the cathode-side catalyst layer was 25 mass %.

The anode catalyst layer (6 µm thickness) was formed in the same manner on another PET sheet.

As an electrolyte membrane, a Nafion membrane (registered trademark) was prepared, and a cathode catalyst layer and an anode catalyst layer were thermocompression bonded to surfaces of the electrolyte membrane and transferred. Frame-shaped sealing members were disposed so as to surround the anode-side catalyst layer and the cathode-side catalyst layer.

Carbon paper was brought into contact with the anode-side catalyst layer. The gas diffusion layer for the cathode was brought into contact with the cathode-side catalyst layer. At this time, on the cathode side, the electrolyte membrane and the gas diffusion layer were arranged so that the direction in which the catalyst ink was applied onto the electrolyte membrane coincided with the rolling direction when the gas diffusion layer was formed. The MEA was produced in this manner.

(2) Production of Unit Cell

A bridge plate for guiding a fuel or an oxidizing agent to each gas diffusion layer was disposed in the vicinity of a manifold formed in advance in the electrolyte membrane, and the entirety was sandwiched by a pair of carbon flat plates (separators), thereby completing a test unit cell A1.

In the separator, a parallel type gas flow path was arranged. The parallel type gas flow path has a plurality of grooves (main flow path) arranged in parallel from one side toward the other side of opposing sides of the separator. Gas flows in parallelly from one side toward the other side of opposing sides of the separator. The interval between the gas flow paths was one time the width of the gas flow path (1 mm).

On the cathode side, the separator and the MEA were arranged so that the longitudinal direction of the gas flow path formed in the separator coincided with the direction in which the catalyst ink was applied onto the electrolyte membrane and the rolling direction of the gas diffusion layer.

(3) Evaluation of Orientation of Conductive Fibers

The main surface of the gas diffusion layer in the MEA obtained above was photographed by SEM. The SEM image was used to determine the first angle by the method described above. The first angle was 13°.

Further, the cathode-side gas diffusion layer of MEA was removed, and the main surface of the gas diffusion layer side of the cathode-side catalyst layer was photographed by SEM. The SEM image was used to determine the second angle by the method described above. The second angle was 14°.

The MEA was cut in a direction along the main flow path, and the cross section was photographed by SEM. The SEM image was used to determine the third A angle and fourth A angle by the methods described above. The third A angle was 34°. The fourth A angle was 60°. The first conductive fibers were inclined from the upstream of the main flow path toward the first interface. The second conductive fiber was also inclined from the upstream of the main flow path toward the first interface. The sum of the third A angle and fourth A angle was 94°.

The MEA was cut in a direction crossing the main flow path at 90°, and the cross section was photographed by SEM. The SEM image was used to determine the fifth A angle and sixth A angle by the methods described above. The fifth A angle was 60°. The sixth A angle was 53°.

(4) Evaluation of Output Characteristics

The power generation performance of the unit cell A1 was evaluated. Specifically, a fuel gas was supplied to the anode such that a utilization rate of 70% was achieved. The dew point of the fuel gas was about 80° C. Also, an oxidant gas was supplied to the cathode such that a utilization rate of 50% was achieved. The dew point of the oxidant gas (air) was about 80° C. Then, a load control apparatus was controlled such that a constant current flowed, and the current densities relative to the electrode area of the anode and the cathode were changed. The peak power density of the unit cell A1 at this time was measured. The evaluation results are shown in Table 1. The peak power density is indicated as an index setting the peak power density of the unit cell B1 of Comparative Example 1 to 100.

Comparative Example 1

In the stacking (1-3) of the layers, the MEA was produced in the same manner as in Example 1, except that the electrolyte membrane and the gas diffusion layer were arranged so that the direction in which the catalyst ink was applied on the electrolyte membrane and the rolling direction in forming the gas diffusion layer crossed each other on the cathode side.

Furthermore, a unit cell B1 was produced in the same manner as in Example 1, except that in the preparation of a unit cell (2), on the cathode side, the separator and MEA were arranged so that the longitudinal direction of the gas flow path formed in the separator coincided with the rolling direction of the gas diffusion layer.

The obtained MEA was evaluated for the orientation of the conductive fiber in the same manner as in Example 1. The first angle was 14°. The second angle was 70°. The third A angle was 35°. The fourth A angle was 58°. The fifth A angle was 30°. The sixth A angle was 60°.

The output characteristics of the obtained unit cell B1 were evaluated in the same manner as in Example 1. The results are shown in Table 1.

TABLE 1

|  | First Angle | Second Angle | Third A Angle | Fourth A Angle | Fifth A Angle | Sixth A Angle | Maximum Output Density |
|---|---|---|---|---|---|---|---|
| Unit Cell A1 | 13° | 14° | 34° | 60° | 60° | 53° | 108 |
| Unit Cell B1 | 14° | 70° | 35° | 58° | 30° | 60° | 100 |

In the unit cell A1 of Example 1, a maximum output density higher than that of the unit cell B1 of Comparative Example 1 was obtained.

Example of Second Embodiment

Example 2

In the stacking (1-3) of the layers, the electrolyte membrane and the gas diffusion layer were arranged so that the direction in which the catalyst ink was applied onto the electrolyte membrane and the rolling direction in forming the gas diffusion layer crossed on the cathode side. In this manner, an MEA was produced, and a unit cell A2 was produced in the same manner as in Example 1. Further, in the preparation of the unit cell (2), on the cathode side, the separator and MEA were arranged so that the longitudinal direction of the gas flow path formed in the separator crossed the rolling direction of the gas diffusion layer.

The main surface of the gas diffusion layer in the MEA obtained above was photographed by SEM. The SEM image was used to determine the first angle by the method described above. The first angle was 76°.

Further, the cathode-side gas diffusion layer of MEA was removed, and the main surface of the gas diffusion layer side of the cathode-side catalyst layer was photographed by SEM. The SEM image was used to determine the second angle by the method described above. The second angle was 13°.

The MEA was cut in the direction crossing the main flow path at 90°, and the cross section was photographed by SEM. The SEM image was used to determine the third B angle and fourth B angle by the methods described above. The third B angle was 34°. The fourth B angle was 63°.

The MEA was cut in the direction along the main flow path, and the cross section was photographed by SEM. The SEM image was used to determine the fifth B angle and sixth B angle by the methods described above. The fifth B angle was 60°. The sixth B angle was 55°. The second conductive fibers were inclined from the upstream of the main flow path toward the first interface.

The power generation performance of the unit cell A2 was evaluated in the same manner as in Example 1.

Comparative Example 2

In the production (2) of the unit cell, the unit cell B2 was produced in the same manner as in Example 2, except that the separator and the MEA were arranged so that the longitudinal direction of the gas flow path formed in the separator crossed the catalyst ink application direction of the catalyst layer on the cathode side.

Orientation of conductive fibers of the obtained MEA was evaluated in the same manner as in Example 2. The first angle was 14°. The second angle was 70°. The third B angle was 30°. The fourth B angle was 60°. The fifth B angle was 35°. The sixth B angle was 58°.

The output characteristics of the obtained unit cell B2 were evaluated in the same manner as in Example 1. The results are shown in Table 2.

TABLE 2

|  | First Angle | Second Angle | Third B Angle | Fourth B Angle | Fifth B Angle | Sixth B Angle | Maximum Output Density |
|---|---|---|---|---|---|---|---|
| Unit Cell A2 | 76° | 13° | 34° | 63° | 60° | 55° | 109 |
| Unit Cell B2 | 14° | 70° | 30° | 60° | 35° | 58° | 100 |

In the unit cell A2 of Example 2, a maximum output density higher than that of the unit cell B2 of Comparative Example 2 was obtained.

INDUSTRIAL APPLICABILITY

The fuel cell according to the present invention is suitable for use in a power supply for a stationary home cogeneration system, or a vehicle power supply. The invention is suitable for use in a polymer electrolyte fuel cell, but the application is not limited thereto. The invention according to the present disclosure is applicable to fuel cells in general.

REFERENCE SIGNS LIST

100: MEA
110: Electrolyte Membrane
120: Catalyst Layer
   120A: First Catalyst Layer
   120B: Second Catalyst Layer
      121: Second conductive fiber
   130A: First gas diffusion layer
   130B: Second gas diffusion layer
      131: First conductive fiber
200: Fuel cell (unit cell)
   240A: First separator
   240B: Second separator
   260A, 260B: Gas Flow Path

The invention claimed is:

1. A membrane electrode assembly for a fuel cell, the membrane electrode assembly comprising an electrolyte membrane, and a first electrode and a second electrode sandwiching the electrolyte membrane, wherein
   the first electrode includes a first catalyst layer and a first gas diffusion layer in order from the electrolyte membrane side,
   the first gas diffusion layer includes a first fibrous conductive member and a first resin material,
   the first catalyst layer includes a second fibrous conductive member, catalyst particles, and a second resin material,
   when viewed from a stacking direction of the membrane electrode assembly,
   a first angle formed by the first fibrous conductive member and a main flow path of a gas supplied to the membrane electrode assembly is 45° or less, and
   a second angle formed by the second fibrous conductive member and the main flow path is 45° or less, wherein when a cross section of the membrane electrode assembly along the main flow path is viewed,
the first fibrous conductive member is parallel to an interface between the first gas diffusion layer and the first catalyst layer, or inclined toward the interface from an upstream of the main flow path, and
a third A angle formed by the first fibrous conductive member and the interface is 70° or less, or
a fourth A angle formed by the second fibrous conductive member and the interface between the first gas diffusion layer and the first catalyst layer is 25° or more and 80° or less, or
wherein the second fibrous conductive member is inclined from an upstream of the main flow path toward the interface between the first gas diffusion layer and the first catalyst layer, or
wherein when a cross section of the membrane electrode assembly crossing the main flow path is viewed,
a fifth A angle formed by the first fibrous conductive member and the interface between the first gas diffusion layer and the first catalyst layer is 45° or more, or
a sixth A angle formed by the second fibrous conductive member and the interface between the first gas diffusion layer and the first catalyst layer is 45° or more.

2. A membrane electrode assembly for a fuel cell, the membrane electrode assembly comprising an electrolyte membrane, and a first electrode and a second electrode sandwiching the electrolyte membrane, wherein
the first electrode includes a first catalyst layer and a first gas diffusion layer in order from the electrolyte membrane side,
the first gas diffusion layer includes a first fibrous conductive member and a first resin material,
the first catalyst layer includes a second fibrous conductive member, catalyst particles, and a second resin material,
when viewed from a stacking direction of the membrane electrode assembly,
a first angle formed by the first fibrous conductive member and a main flow path of a gas supplied to the membrane electrode assembly is 45° or less, and
a second angle formed by the second fibrous conductive member and the main flow path is 45° or less,
wherein when a cross section of the membrane electrode assembly along the main flow path is viewed,
the first fibrous conductive member is parallel to an interface between the first gas diffusion layer and the first catalyst layer, or inclined toward the interface from an upstream of the main flow path, and
a third A angle formed by the first fibrous conductive member and the interface is 70° or less, and
a fourth A angle formed by the second fibrous conductive member and the interface between the first gas diffusion layer and the first catalyst layer is 25° or more and 80° or less, and
wherein the second fibrous conductive member is inclined from an upstream of the main flow path toward the interface between the first gas diffusion layer and the first catalyst layer, and
a sum of the third A angle and the fourth A angle is 25° or more and 110° or less.

3. A membrane electrode assembly for a fuel cell, the membrane electrode assembly comprising an electrolyte membrane, and a first electrode and a second electrode sandwiching the electrolyte membrane, wherein
the first electrode includes a first catalyst layer and a first gas diffusion layer in order from the electrolyte membrane side,
the first gas diffusion layer includes a first fibrous conductive member and a first resin material,
the first catalyst layer includes a second fibrous conductive member, catalyst particles, and a second resin material,
when viewed from a stacking direction of the membrane electrode assembly,
a first angle formed by the first fibrous conductive member and a main flow path of a gas supplied to the membrane electrode assembly is greater than 45°, and
a second angle formed by the second fibrous conductive member and the main flow path is 45° or less,
wherein when a cross section of the membrane electrode assembly crossing the main flow path is viewed,
a third B angle formed by the first fibrous conductive member and the interface between the first gas diffusion layer and the first catalyst layer is less than 45°, or
a fourth B angle formed by the second fibrous conductive member and the interface between the first gas diffusion layer and the first catalyst layer is 45° or more, or
wherein when a cross section of the membrane electrode assembly along the main flow path is viewed,
a fifth B angle formed by the first fibrous conductive member and the interface between the first gas diffusion layer and the first catalyst layer is 45° or more, or
a sixth B angle formed by the second fibrous conductive member and the interface between the first gas diffusion layer and the first catalyst layer is 25° or more and 80° or less.

4. A fuel cell comprising the membrane electrode assembly of claim 1, and a first separator and a second separator sandwiching the membrane electrode assembly.

5. A fuel cell comprising the membrane electrode assembly of claim 3, and a first separator and a second separator sandwiching the membrane electrode assembly.

* * * * *